United States Patent Office 2,771,476
Patented Nov. 20, 1956

2,771,476

11α-ACYLOXY-17α-HALO-4-PREGNENE-3,20-DIONE AND PROCESS

Douglas A. Lyttle and Robert H. Levin, Kalamazoo Township, Kalamazoo County, Mich., assignors to The Upjohn Company, Kalamazoo, Mich., a corporation of Michigan No Drawing. Application August 27, 1953,
Serial No. 376,988

14 Claims. (Cl. 260—397.45)

The present invention relates to novel steroid esters and is particularly concerned with 11α-acyloxy-17α-halo-4-pregnene-3,20-diones and with a process for the production thereof.

The novel compounds of the present invention are represented by the following formula:

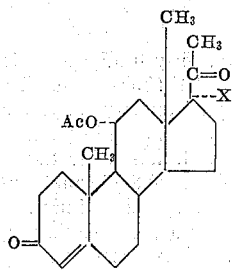

wherein Ac is the acyl radical of a carboxylic acid containing up to and including eight carbon atoms and X is a halogen atom selected from the class consisting of chlorine and bromine.

The novel compounds of this invention are prepared by selective dehydrohalogenation of 4,17α-dihalo-11α-acyloxy-4-pregnene-3,20-dione, i. e., by forming a 3-hydrazone of an 11α-acyloxy-17α-halo-4-pregnene-3,20-dione by treating 11α-acyloxy-4,17α-dihalopregnane-3,20-dione in the presence of an acid with an organic hydrazine capable of forming a hydrazone and hydrolyzing the 3-hydrazone group without simultaneously removing the 17α-halo atom. For this purpose any organic hydrazine containing two hydrogen atoms on one of the hydrazino nitrogen atoms can be used. The hydrolysis of the 3-hydrazone group is advantageously effected by an exchange reaction with a ketaldone. The word ketaldone refers generically to aldehydes and ketones. For this purpose a ketaldone in which the oxo group is attached to an electrophylic group, as in pyruvic acid, pyruvic aldehyde, and benzaldehydes, such as meta-, para-, and ortho-hydroxy-benzaldehydes, and meta-, para-, and ortho-carboxybenzaldehydes, is advantageous.

It is an object of the present invention to provide novel 11α-acyloxy-17α-halo-4-pregnene-3,20-diones. Another object of the invention is to provide a process for the production of 11α-acyloxy-17α-halo-4-pregnene-3,20-dione. It is another object of the present invention to provide a method of a selective dehydrohalogenation, restricted to the 4,5-position of the steroid molecule. Other objects of this invention will be apparent to one skilled in the art to which this invention pertains.

The novel compounds, 11α-acyloxy-17α-halo-4-pregnene-3,20-diones, of the present invention are stable, easily crystallizable solids which have not only pharmacological and physiological activity per se but are also important intermediates in the production of active 11-oxygenated keto steroids. For example, dehydrohalogenation of an 11α-acyloxy-17-bromo-4-progesterone with pyridine and epoxidation of the thus-obtained 11α-acyloxy-16-dehydroprogesterone yields 11α-acyloxy-16,17-oxido-progesterone. The epoxide is then opened with hydrogen bromide, and the resulting 16-bromo-17α-hydroxy derivative treated with zinc dust to remove the 16-bromine. The 11α-acyloxy-17α-hydroxyprogesterone, thus-obtained, on saponification and oxidation yields the known 17α-hydroxy-11-ketoprogesterone (21-Desoxy "E") which on treatment with lead tetraacetate, followed by saponification gives cortisone (17α,21-dihydroxy-4-pregnene-3,11,-20-trione), and on treatment with lithium aluminum hydride, with protection of the 3- and 20-keto groups, gives 11α,17α-dihyroxy-4-pregnene-3,20-dione (21-Desoxy "F"), a new compound possessing pronounced inhibiting effect on the secretion of the adrenocorticotropic hormone (ACTH) and having value, therefore, in the treatment of diseases where oversecretion of ACTH and adrenal hormones occurs, for example, in adrenal hyperplasia and pituitary basophilism (Cushing's disease).

The starting compounds of the present invention are the 4,17α-dihalo-11α-acyloxypregnane-3,20-diones. The acyl group can have substituents, such as halo, mercapto, methoxy, ethoxy, hydroxy, carboxy, carbalkoxy, and the like. They are prepared by treatment of 11α-hydroxy-pregnane - 3,20 - dione or an 11α-acyloxypregnane-3,20-dione with an acid anhydride to form the corresponding enol ester a 3,11α,20 - triacyloxy - 4,17(20)-pregnadiene, which by treatment with a hypohalous acid furnishes a 4,17α-dihalo-11α-acyloxypregnane-3,20-dione, as shown in Preparations 1 through 6.

In carrying out the process, 4,17-dihalo steroid of the selective dehydrohalogenation of a selected 4,17α-dihalo-11α-acyloxypregnane-3,20-dione is dissolved in an organic solvent, such as doxane, acetic acid, acetone, dimethylformamide, tertiary butyl alcohol, ethanol, or mixtures of these solvents, with dioxane and acetic acid preferred, containing from about five to 25 percent water. To this solution is added, usually with continuous stirring, a solution of an organic hydrazine, such as semicarbazide, phenylhydrazine, 2,4-dinitrophenylhydrazine, para-nitrophenylhydrazine, α- or β-naphthylsemicarbazide, 2,4- and 3,5-dinitrophenylsemicarbazide, and other substituted hydrazines, with semicarbazide preferred. The reaction advantageously is carried out at a temperature between about fifteen and about forty degrees centigrade. Higher and lower temperatures, between about zero degrees and about 100 degrees centigrade, however, are operative. The time of reaction varies from about half an hour to twelve hours, or even longer, and during this period a color change from colorless to yellow or orange and back to colorless or pale yellow is noted.

The 11α-acyloxy-17α-halo-4-pregnene-3,20-dione 3-substituted hydrazone thus-obtained can be isolated from the mixture by adding more water and filtering the precipitated compound but advantageously is immediately reacted in solution with an aldehyde or ketone without isolation. The aldehydes or ketones used are usually pyruvic acid, pyruvic aldehyde, benzaldehydes, such as hydroxybenzaldehyde and the carboxybenzaldehydes, and the like. Pyruvic acid is preferred since it is water soluble and can be used in aqueous organic solvents such as dioxane-water solution while benzaldehydes are usually used in acetic acid solutions. The temperature of the reaction can vary between about zero and about 100 degrees centigrade but advantageously is kept between about 25 and about seventy degrees centigrade. The reaction time depends in part on the temperature and varies at room temperature, i. e., at about twenty to thirty degrees centigrade, between eight and 36 hours and, at temperatures between fifty to seventy degrees centigrade, from one to about four hours. The product, 11α-acyloxy-17α-halo-4-pregnene-3,20-dione, is isolated from the solution by pouring the cooled solution into water, extracting with a suitable solvent, such as dichloromethane, chloroform, ether or benzene, and evaporating the solvent from the resulting extract.

The following examples illustrate the process and products of the present invention but are not to be construed as limiting.

PREPARATION 1.—3,11α,20-TRIACETOXY-3,17(20)-PREGNADIENE

A mixture of 300 milligrams of 11α-hydroxypregnane-3,20-dione, fifteen milliliters of acetic anhydride, and 140 milligrams of para-toluenesulfonic acid monohydrate was heated to boiling and allowed to distil slowly for four hours, most of the excess acetic anhydride being distilled at the end of this time interval. The last traces of excess acetic anhydride were removed under vacuum, and the resulting residue was cooled and dissolved in ether. The ether solution was washed with cold ten percent aqueous sodium bicarbonate solution and dried over anhydrous sodium sulfate. The drying agent was removed by filtration, and the ether was distilled. The residue was dissolved in warm alcohol and allowed to crystallize. The crystalline 3,11α,20-triacetoxy-3,17(20)-pregnadiene (150 milligrams) melted at 162–167 degrees centigrade. Its structure was confirmed by infrared analysis.

PREPARATION 2.—3,11α,20-TRIPROPIONOXY-3,17(20)-PREGNADIENE

Using the procedure of Preparation 1, 11α-hydroxypregnane-3,20-dione is converted to 3,11α-20-tripropionoxy-3,17(20)-pregnadiene using propionic anhydride and para-toluenesulfonic acid.

PREPARATION 3.—3,11α,20-TRIHEPTANOYLOXY-3,17(20)-PREGNADIENE

11α-hydroxypregnane-3,20-dione is converted by the procedure of Preparation 1 to 3,11α,20-triheptanoyloxy-3,17(20-pregnadiene by heating for five hours with heptanoic anhydride and para-toluenesulfonic acid with toluene added as a solvent.

By the procedure of Preparations 1 through 3, other 3,11α,20-triacyloxy-3,17(20)-pregnadienes are prepared by heating 11α-hydroxypregnane-3,20-dione with a selected acid anhydride including: 3,11a,20-tributyroxy-3,17(20) - pregnadiene, 3,11α,20 - trivaleroxy - 3,17(20)-pregnadiene, 3,11α,20 - triisovaleroxy-3,17(20) - pregnadiene, 3,11α,20-trihexanoyloxy-3,17(20)-pregnadiene, 3,11α,20-trioctanoyloxy-3,17(20)-pregnadiene, 3,11α,20-tribenzyloxy-3,17(20)-pregnadiene, and the like.

PREPARATION 4.—3,20-DIACETOXY-11α-BENZOYLOXY-3,17(20)-PREGNADIENE

To a solution of 11α-hydroxypregnane-3,20-dione in pyridine was added an excess of benzoylchloride. After the solution stood for two hours at room temperature water was added, and the crystals filtered off and washed. The thus obtained 11α-benzoyloxypregnane-3,20-dione was then treated as in Preparation 1 with acetic anhydride to give 3,20-diacetoxy-11α-benzoyloxy-3,17(20)-pregnadiene.

In the same manner as shown above by treating a selected 11α-acyloxypregnane-3,20-dione with an acid anhydride of a different carboxylic acid, 3,20-enol esters of 11α-acyloxypregnane-3,20-dione are obtained wherein the acyloxy groups on the 3- and 20-position are the same and that at the 11α-position is different. Such representative 3,11,20-triacyloxy-3,17(20)-pregnadienes include: 3,20-dipropionoxy - 11α - benzoyloxy - 3,17(20) - pregnadiene, 3,20 - dibutyroxy - 11α - benzoyloxy - 3,17(20) - pregnadiene, 3,20 - divaleroxy - 11α-benzoyloxy - 3,17(20)-pregnadiene, 3,20 - dihexanoyloxy - 11α - acetoxy-3,17(20) - pregnadiene, 3,20 - diacetoxy - 11α - propionoxy-3,17(20)-pregnadiene, 3,20-diacetoxy-11α-butyroxy-3,17(20) - pregnadiene, 3,20-diacetoxy-11α-valeroxy-3,17(20) pregnadiene, 3,20 - diacetoxy - 11α - isovaleroxy - 3,17 (20) - pregnadiene, 3,20 - diacetoxy - 11α - heptanoyloxy-3,17(20) - pregnadiene, 3,20 - diacetoxy - 11a - octanoyloxy - 3,17(20) - pregnadiene, 3,20 - diacetoxy - 11α-phenylacetoxy-3,17(20)-pregnadiene, 3,20-diacetoxy-11α-toluyloxy - 3,17(20) - pregnadiene, 3,20 - diacetoxy - 11α-(β - cyclopentylpropionoxy) - 3,17(20) - pregnadiene, 3,20 - diacetoxy - 11α - trimethylacetoxy - 3,17(20)-pregnadiene, 3,20-diacetoxy-11α-chloroacetoxy-3,17(20)-pregnadiene, 3,20-diacetoxy-11α-bromoacetoxy-3,17(20)-pregnadiene, 3,20 - diacetoxy - 11α - dichloroacetoxy-3,17(20) - pregnadiene, 3,20 - diacetoxy - 11α - trichloroacetoxy - 3,17(20) - pregnadiene, 3,20 - diacetoxy - 11α-anisyloxy - 3,17(20) - pregnadiene, 3,20 - diacetoxy - 11α-gallyloxy - 3,17(20) - pregnadiene, 3,20 - diacetoxy-11α-mandelyloxy-3,17(20)-pregnadiene, 3,20-diacetoxy-11α - toluenesulfonyloxy - 3,17(20) - pregnadiene, 3,20-diacetoxy - 11α - benzenesulfonyloxy - 3,17(20) - pregnadiene, 3,20 - diacetoxy - 11α - chlorobenzenesulfonyloxy-3,17(20)-pregnadiene, 3,20-diacetoxy-11α-(α-naphthalenesulfonyloxy) - 3,17(20) - pregnadiene, 3,20 - diacetoxy - 11α - benzenephosphonyloxy - 3,17(20) - pregnadiene, 3,20 - diacetoxy - 11α - thioglycolyloxy - 3,17 (20)-pregnadiene, and the like.

PREPARATION 5.—4,17α-DIBROMO-11α-ACETOXYPREGNANE-3,20-DIONE

One hundred and fifty milligrams (150 milligrams) of 3,11α,20-triacetoxy-3,17(20)-pregnadiene was dissolved in eight milliliters of tertiary butyl alcohol and treated with a solution of 128 milligrams of N-bromosuccinimide in fifteen milliliters of tertiary butyl alcohol and with five milliliters of 00.8 Normal sulfuric acid. After two hours of standing the solution was concentrated, diluted with water and the resulting crystals (140 milligrams) collected. Four recrystallizations from alcohol gave white crystals of 11α-acetoxy-4,17α-dibromopregnane-3,20-dione melting at 201 to 203 degrees centigrade with decomposition.

Analysis:
Calculated for $C_{23}H_{32}O_4Br_2$: C, 51.89; H, 6.06; Br, 30.03
Found: C, 52.16; H, 5.96; Br, 30.01

In a similar manner, using a 3,20-dienol acylate of the appropriate 11α - acyloxypregnane compound and N-bromosuccinimide, the following compounds are prepared: 4,17α - dibromo - 11α - propionyloxypregnane-3,20-dione, 4,17α-dibromo-11α-butyroxypregnane-3,20-dione, 4,17α-dibromo-11α-valeroxypregnane-3,20-dione, 4,17α - dibromo - 11α - isovaleroxypregnane - 3,20 - dione, 4,17α - dibromo - 11α - hexanoyloxypregnane - 3,20 - dione, 4,17α-dibromo-11α-heptanoyloxypregnane-3,20-dione, 4,17α-dibromo-11α-octanoyloxypregnane-3,20-dione, 4,17α - dibromo - 11α - benzoyloxpregnane - 3,20 - dione, 4,17α - dibromo - 11α - phenylacetoxypregnane - 3,20 - dione, 4,17α - dibromo - 11α - toluyloxypregnane - 3,20-dione, 4,17α - dibromo - 11α - (β - cyclopentylpropionoxy)-pregnane-3,20-dione, 4,17α-dibromo-11α-trimethylacetoxypregnane-3,20-dione, 4,17α-dibromo-11α-chloroacetoxypregnane-3,20-dione, 4,17α-dibromo-11α-dichloroacetoxypregnane - 3,20 - dione, 4,17α - dibromo - 11α-trichloroacetoxypregnane-3,20-dione, 4,17α-dibromo-11α-bromoacetoxypregnane-3,20-dione, 4,17-α-dibromo-11α-anisyloxypregnane-3,20-dione, 4,17a-dibromo-11α-gallyloxypregnane - 3,20 - dione, 4,17α - dibromo - 11α - mandelyloxypregnane - 3,20 - dione, 4,17α - dibromo - 11α-thioglycolyloxypregnane-3,20-dione, and the like.

PREPARATION 6.—4,17α-DICHLORO-11α-ACETOXY-PREGNANE-3,20-DIONE

Following the procedure given in Preparation 5, but using hypochlorous acid, or a mineral acid with a hypochlorite such as sodium or calcium hypochlorite, or N-chlorosuccinimide or N-chloroacetamide with dilute sulfuric acid, instead of the N-bromosuccinimide, to treat a solution of 3,11α,20-triacetoxy-3,17(20)-pregnadiene in tertiary butyl alcohol, 4,17α-dichloro-11α-acetoxypregnane-3,20-dione is obtained.

In the same manner, using a 3,20-dienol acylate of the appropriate pregnane compound and hypochlorous acid or an N-chloroacylamide, the following compounds are prepared: 4,17α-dichloro-11α-propionoxypregnane-3,20-dione, 4,17α-dichloro-11α-butyroxypregnane-3,20-dione, 4,17α-dichloro-11α-valeroxypregnane-3,20-dione, 4,17α-dichloro-11α-isovaleroxypregnane-3,20-dione, 4,17α-dichloro-11α-hexanoyloxypregnane-3,20-dione, 4,17α-dichloro-11α-heptanoyloxypregnane-3,20-dione, 4,17α-dichloro-11α-octanoyloxypregnane-3,20-dione, 4,17α-dichloro-11α-benzoxylpregnane-3,20-dione, 4,17α-dichloro-11α-phenylacetoxypregnane-3,20-dione, 4,17α-dichloro-11α-toluyloxypregnane-3,20-dione, 4,17α-dichloro-11α-(β-cyclopentylpropionoxy)-pregnane-3,20-dione, 4,17α-dichloro-11α-trimethylacetoxypregnane-3,20-dione, 4,17α-dichloro-11α-chloroacetoxypregnane-3,20-dione, 4,17α-dichloro-11α-dichloroacetoxypregnane-3,20-dione, 4,17α-dichloro-11α-bromoacetoxypregnane-3,20-dione, 4,17α-dichloro-11α-anisyloxypregnane-3,20-dione, 4,17α-dichloro-11α-gallyloxypregnane-3,20-dione, 4,17α-dichloro-11α-mandelyloxypregnane-3,20-dione, 4,17α-dichloro-11α-thioglycolyloxypregnane-3,20-dione, and the like.

*Example 1.—11α-acetoxy-17α-bromo-4-pregnene-3,20-dione*

A solution of 532 milligrams (one millimole) of 4,17α-dibromo-11α-acetoxypregnane-3,20-dione in 100 milliliters of dioxane was admixed with 2.5 milliliters of an aqueous solution containing 223 milligrams (two millimoles) of semicarbazide and 164 milligrams (two millimoles) of sodium acetate trihydrate. The color of the reaction mixture changed slowly from very light yellow to orange and gradually back to a pale yellow color. The mixture was stirred overnight at room temperature, and thereafter a solution consisting of 0.52 milliliter of pyruvic acid in five milliliters of water was added. The reaction mixture was then heated to about seventy degrees centigrade for a period of three hours, thereafter cooled and poured into 200 milliliters of water. The thus-produced 11α-acetoxy-17α-bromo-4-pregnene-3,20-dione was extracted from the aqueous mixture with three 75-milliliter portions of methylene dichloride. The extracts were washed with two fifty-milliliter portions of one percent aqueous sodium hydroxide solution, then with water until the wash-water was neutral, and then dried over anhydrous sodium sulfate and concentrated to yield 0.452 gram of an oil. This oil containing 11α-acetoxy-17α-bromo-4-pregnene-3,20-dione was purified by chromatography and recrystallization from acetone and Skellysolve B (hexanes) yielding 162 milligrams of 11α-acetoxy-17α-bromo-4-pregnene-3,20-dione of melting point 166 to 168 degrees centigrade.

*Analysis.*—Calculated for $C_{23}H_{31}BrO_4$: Br, 17.70. Found: Br, 17.65.

*Example 2.—11α-benzoyloxy-17α-bromo-4-pregnene-3,20-dione*

A solution of 4,17α-dibromo-11α-benzoyloxypregnane-3,20-dione dissolved in acetic acid was admixed with a solution of 2,4-dinitrophenylhydrazine hydrochloride and sodium acetate in acetic acid. After stirring for eighteen hours at room temperature, the mixture was poured into water and the 3-(2,4-dinitrophenylhydrazone) of 11α-benzoyloxy-17α-bromo-4-pregnene-3,20-dione was obtained by extraction with methylene dichloride. The thus-obtained 2,4-dinitrophenylhydrazone was then heated with para-hydroxybenzaldehyde in acetic acid solution to give 11α-benzoyloxy-17α-bromo-4-pregnene-3,20-dione.

In a similar manner as in the above example but using 3,5-dinitrophenylhydrazone, phenylhydrazine, para-nitrophenylhydrazine, semicarbazide, or α- or β-naphthylsemicarbazide (instead of 2,4-dinitrophenylhydrazine) and pyruvic acid, pyruvic aldehyde, or carboxybenzaldehydes (instead of para-hydroxybenzaldehyde) to treat 11α-benzoyloxy-4,17α-dibromopregnane-3,20-dione, 11α-benzoyloxy-17α-bromo-4-pregnene-3,20-dione is obtained.

*Example 3.—11α-propionoxy-17α-chloro-4-pregnene-3,20-dione*

In a manner as given in Example 1, 4,17α-dichloro-11α-propionoxypregnane-3,20-dione is dehydrohalogenated with semicarbazide and pyruvic acid to yield 11α-propionoxy-17α-chloro-4-pregnene-3,20-dione.

*Example 4.—11α-(β-cyclopentylpropionoxy)-17α-bromo-4-pregnene-3,20-dione*

In a manner as given in Example 1, 4,17α-dibromo-11α-(β-cyclopentylpropionoxy)-pregnane-3,20-dione is dehydrohalogenated with semicarbazide and pyruvic acid to yield 11α-(β-cyclopentylpropionoxy)-17α-bromo-4-pregnene-3,20-dione.

*Example 5.—11α-butyroxy-17α-chloro-4-pregnene-3,20-dione*

In a manner as given in Example 1, 4,17α-dichloro-11α-butyroxypregnane-3,20-dione is dehydrohalogenated with semicarbazide and pyruvic acid to yield 11α-butyroxy-17α-chloro-4-pregnene-3,20-dione.

*Example 6.—11α-butyroxy-17α-bromo-4-pregnene-3,20-dione*

In a manner as given in Example 1, 4,17α-dibromo-11α-butyroxypregnane-3,20-dione is dehydrohalogenated with semicarbazide and pyruvic acid to yield 11α-butyroxy-17α-bromo-4-pregnene-3,20-dione.

*Example 7.—11α-mandelyloxy-17α-bromo-4-pregnene-3,20-dione*

In a manner as given in Example 1, 4,17α-dibromo-11α-mandelyloxypregnane-3,20-dione is dehydrohalogenated with semicarbazide and pyruvic acid to yield 11α-mandelyloxy-17α-bromo-4-pregnene-3,20-dione.

*Example 8.—11α-chloroacetoxy-17α-bromo-4-pregnene-3,20-dione*

In a manner as given in Example 1, 4,17α-dibromo-11α-chloroacetoxypregnane-3,20-dione is dehydrohalogenated with semicarbazide and pyruvic acid to yield 11α-chloroacetoxy-17α-bromo-4-pregnene-3,20-dione.

In a manner similar to Example 1 through 8, other 11α - acyloxy - 17α - halo - 4 - pregnene - 3,20 - diones are prepared by dehydrohalogenating the corresponding 4,17α - dihalo - 11α - acyloxypregnane - 3,20 - dione with organic hydrazine capable of hydrazone formation and a ketaldone advantageously selected from the group consisting of pyruvic acid, pyruvic aldehyde, and benzaldehydes. Representative 11α - acyloxy - 17α - halo - 4-pregnene-3,20-diones thus prepared include: 17α-chloro- and 17α - bromo - 11α - valeroxy - 4 pregnene - 3,20-diones, 17α-chloro- and 17α-bromo-11α-isovaleroxy-4-pregnene-3,20-diones, 17α-chloro- and 17α-bromo-11α-hexanoyloxy - 4 - pregnene - 3,20 - diones, 17α - chloro- and 17α - bromo - 11α - heptanoyloxy - 4 - pregnene-3,20-diones, 17α-chloro- and 17α-bromo-11α-octanoyloxy-4 - pregnene - 3,20 - diones, 17α - chloro- and 17α-bromo - 11α - phenylacetoxy - 4 - pregnene - 3,20-diones, 17α - chloro- and 17α - bromo - 11α - toluyloxy - 4 - pregnene - 3,20 - diones, 17α - chloro- and 17α - bromo - 11α - trimethylacetoxy - 4 -pregnene - 3,20-diones, 17α - chloro- and 17α - bromo - 11α - bromoacetoxy - 4 - pregnene - 3,20 - diones, 17α - chloro- and 17α - bromo - 11α - dichloroacetoxy - 4 - pregnene-3,20 - diones, 17α - chloro- and 17α - bromo - 11α-trichloroacetoxy - 4 - pregnene - 3,20 - diones, 17α-chloro- and 17α - bromo - 11α - anisyloxy - 4 - pregnene - 3,20 - diones, 17α - chloro- and 17α - bromo-11α - gallyloxy - 4 - pregnene - 3,20 - diones, 17α-chloro- and 17α - bromo - 11α - vinylacetoxy - 4- pregnene - 3,20 - diones, 17α - chloro- and 17α-bromo - 11α - acryIyloxy - 4 - pregnene - 3,20 - diones, 17α - chloro- and 17α - bromo - 11α - thioacetoxy - 4-pregnene-3,20-diones, and the like.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. An 11α - acyloxy - 17α - halo - 4 - pregnene - 3,20-dione of the formula:

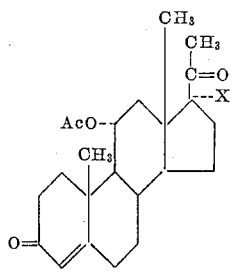

wherein Ac is the acyl radical of a hydrocarbon carboxylic acid containing not more than eight carbon atoms and wherein X is selected from the group consisting of chlorine and bromine.

2. 11α - acyloxy - 17α - chloro - 4 - pregnene - 3,20-dione wherein the acyl radical is of a hydrocarbon carboxylic acid containing up to and including eight carbon atoms.

3. 11α - acyloxy - 17α - bromo - 4 - pregnene - 3,20-dione wherein the acyl radical is of a hydrocarbon carboxylic acid containing up to and including eight carbon atoms.

4. 11α - benzoyloxy - 17α - bromo - 4 - pregnene-3,20 - dione.

5. 11α - acetoxy - 17α - bromo - 4 - pregnene - 3,20-dione.

6. 11α - propionoxy - 17α - chloro - 4 - pregnene-3,20-dione.

7. 11α - butyroxy - 17α - bromo - 4 - pregnene-3,20-dione.

8. 11α - (β - cyclopentylpropionoxy) - 17α - bromo-4-pregnene-3,20-dione.

9. A process for the selective dehydrohalogenation of a 4,17α - dihalo - 11α - acyloxypregnane - 3,20 - dione to produce 11α - acyloxy - 17α - halo - 4 - pregnene-3,20-dione wherein the halogen atom is selected from the class consisting of chlorine and bromine which comprises: forming a 3-hydrazone of 11α-acyloxy-17α-halo-4-pregnene-3,20-dione, wherein the acyloxy group contains from one to eight carbon atoms, inclusive by reacting 4,17α - dihalo - 11α - acyloxypregnane - 3,20-dione in acid solution with an organic hydrazine and hydrolyzing the 3-hydrazone group by an exchange reaction with a ketaldone to yield the corresponding 11α-acyloxy-17α-halo-4-pregnene-3,20-dione.

10. A process for the selective dehydrohalogenation of a 4,17α-dihalo-11α-acyloxypregnane-3,20-dione to produce 11α - acyloxy - 17α - halo - 4 - pregnene - 3,20-dione wherein the halogen atom is selected from the class consisting of chlorine and bromine which comprises: forming a 3-hydrazone of 11α-acyloxy-17α-halo-4-pregnene-3,20-dione, wherein the acyloxy group contains from one to eight carbon atoms, inclusive, by reacting 4,17α-dihalo-11α-acyloxypregnane-3,20-dione in acid solution with an organic hydrazine and hydrolyzing the 3-hydrazone group by an exchange reaction with a ketaldone selected from the group consisting of pyruvic acid, pyruvic aldehyde, and benzaldehydes to yield the corresponding 11α-acyloxy-17α-halo-4-pregnene-3,20-dione.

11. A process for the selective dehydrohalogenation of a 4,17α-dihalo-11α-acyloxypregnane-3,20-dione to produce 11α - acyloxy - 17α - halo - 4 - pregnene - 3,20-dione wherein the halogen atom is selected from the group consisting of chlorine and bromine which comprises: reacting a 4,17-dihalo-11α-acyloxypregnane-3,20-dione, wherein the acyloxy group contains from one to eight carbon atoms, inclusive, with semicarbazide and treating the thus-obtained 3-semicarbazone of 11α-acyloxy-17α-halo-4-pregnene-3,20-dione with pyruvic acid to obtain the corresponding 11α-acyloxy-17α-halo-4-pregnene-3,20-dione.

12. A process for the selective dehydrohalogenation of 4,17-dichloro-11α-acyloxypregnane-3,20-dione to produce 11α - acyloxy - 17α - chloro - 4 - pregnene - 3,20-dione, which comprises: reacting 4,17-dichloro-11α-acyloxypregnane-3,20-dione, wherein the acyloxy group contains from one to eight carbon atoms, inclusive, with semicarbazide and treating the thus-obtained 3-semicarbazone of 11α-acyloxy-17α-chloro-4-pregnene-3,20-dione with pyruvic acid to obtain 4,17-dichloro-11α-acyloxy-3,20-dione.

13. A process for the selective dehydrohalogenation of 4,17-dibromo-11α-acyloxypregnane-3,20- dione to produce 11α - acyloxy - 17α - bromo - 4 - pregnene - 3,20-dione which comprises: reacting 4,17α-dibromo-11α-acyloxypregnane-3,20-dione, wherein the acyloxy group contains from one to eight carbon atoms, inclusive, with semicarbazide and treating the thus-obtained 3-semicarbazone of 11α-acyloxy-17α-bromo-4-pregnene-3,20-dione with pyruvic acid to obtain the corresponding 11α-acyloxy-17α-bromo-4-pregnene-3,20-dione.

14. A proces for the selective dehydrohalogenation of 4,17α - dihalo - 11α - acyloxypregnane - 3,20 - dione wherein the acyl group is of a hydrocarbon carboxylic acid containing up to and including eight carbon atoms, which comprises: reacting a 4,17α-dihalo-11α-acyloxypregnane-3,20-dione, wherein the acyloxy group contains from one to eight carbon atoms, inclusive, with semicarbazide and treating the thus-obtained 3-semicarbazone of 11α-acyloxy-17α-bromo-4-pregnene - 3,20 - dione with pyruvic acid to obtain the corresponding 11α-acyloxy-17α-halo-4-pregnene-3,20-dione.

No references cited.